Feb. 6, 1951     R. B. BURTON     2,540,709
METHOD OF MAKING PROPELLER BLADES FOR AIRPLANES
Filed June 12, 1945     4 Sheets-Sheet 1
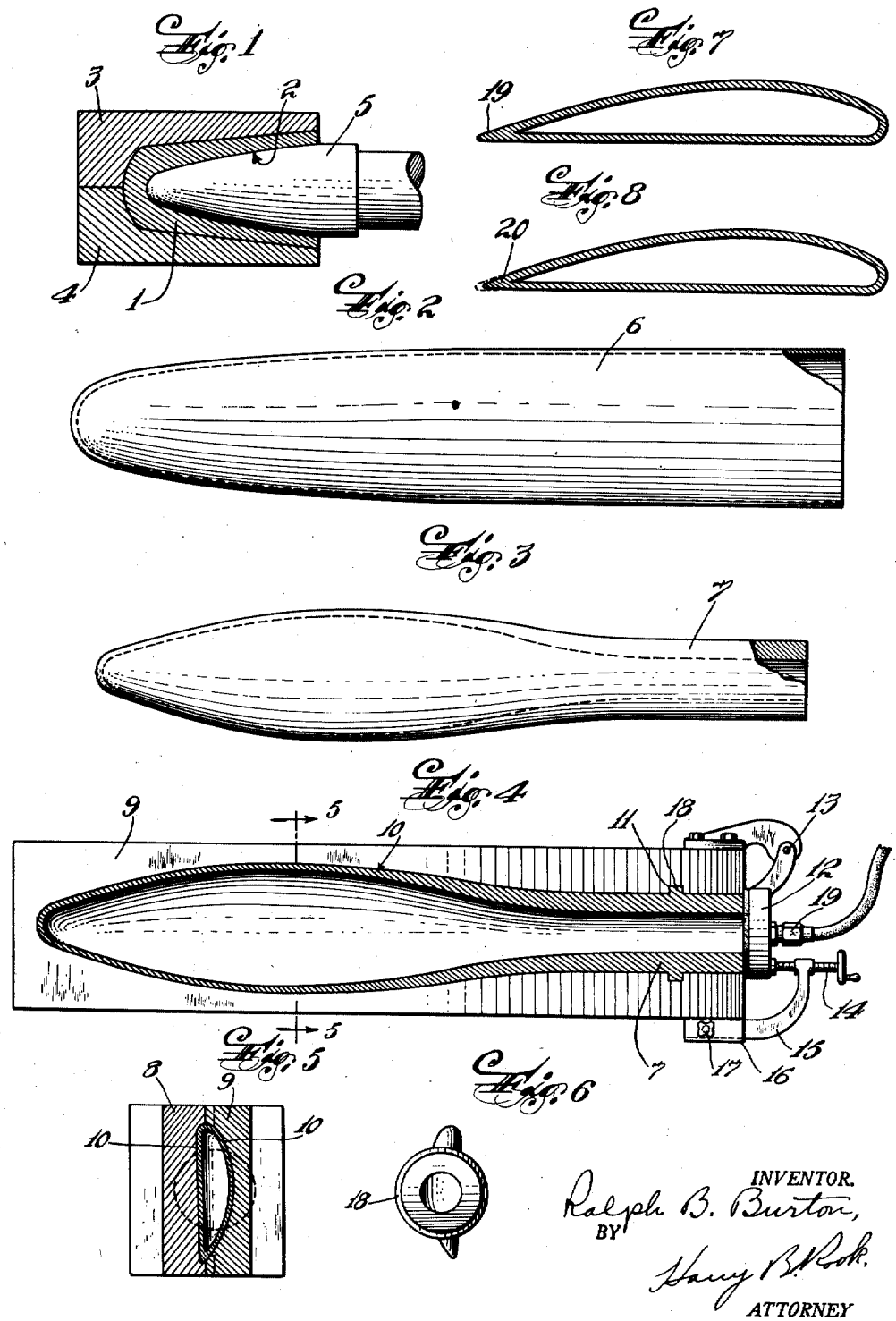

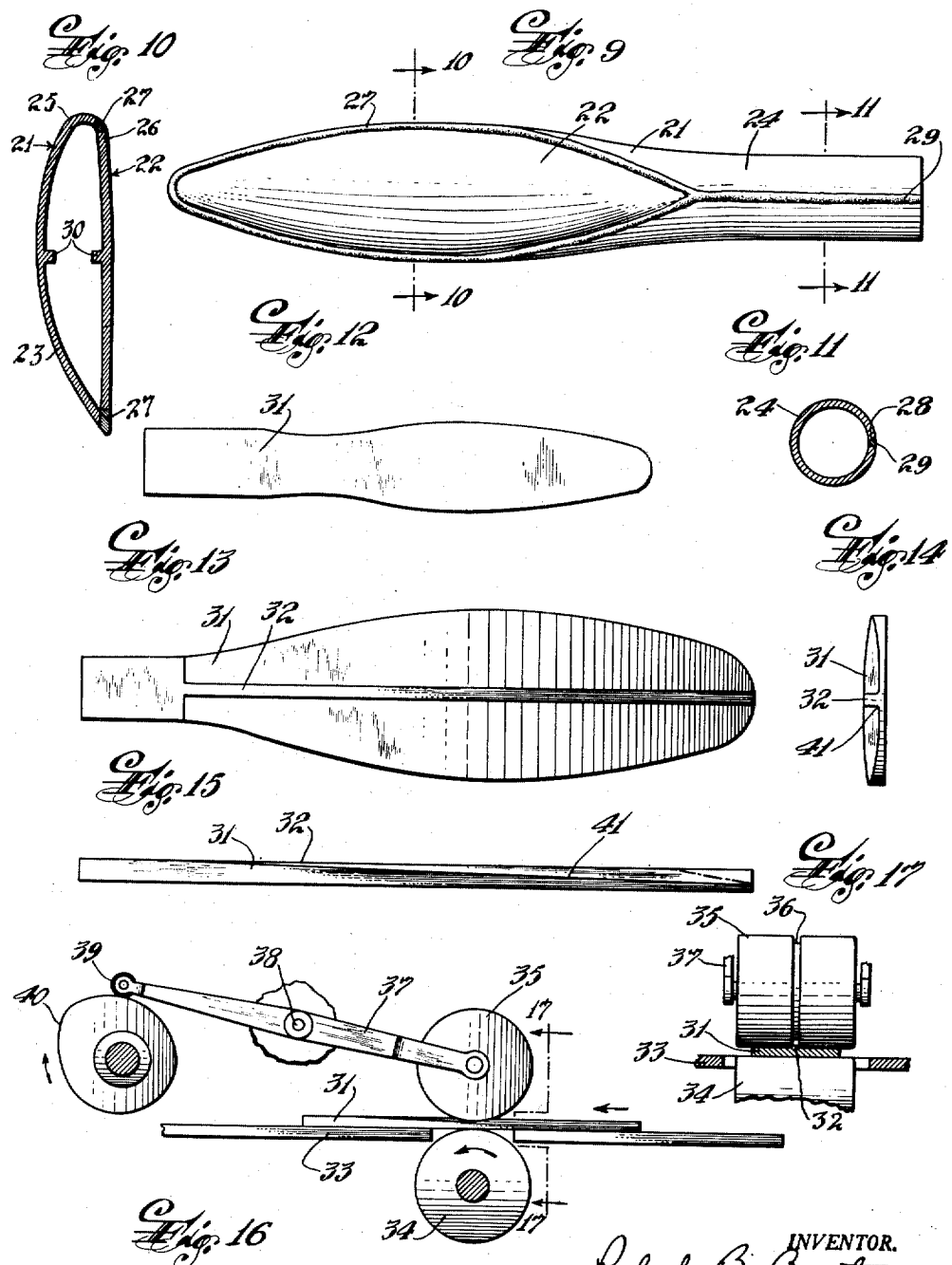

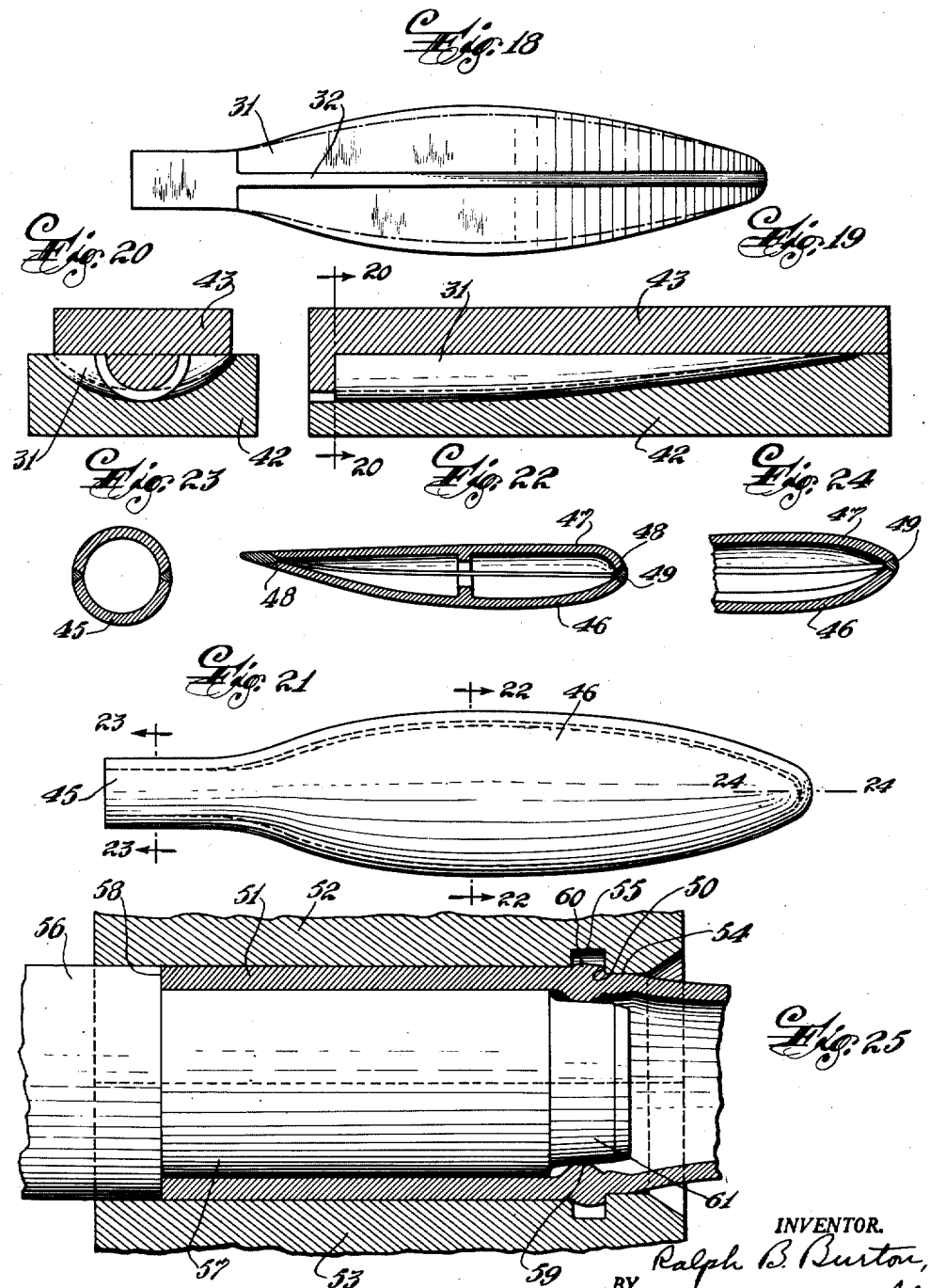

Feb. 6, 1951            R. B. BURTON            2,540,709
METHOD OF MAKING PROPELLER BLADES FOR AIRPLANES
Filed June 12, 1945            4 Sheets-Sheet 4
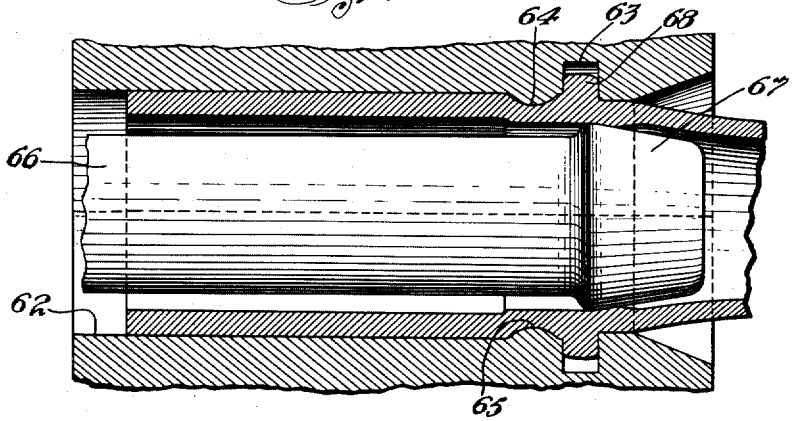
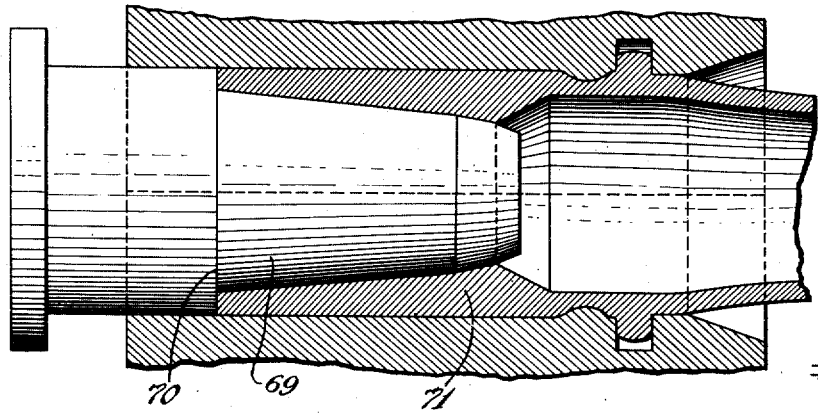
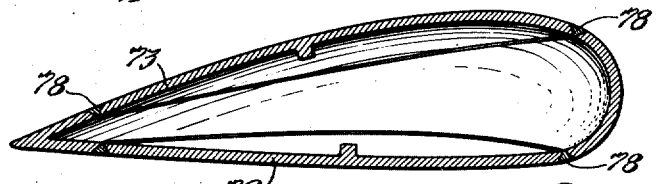
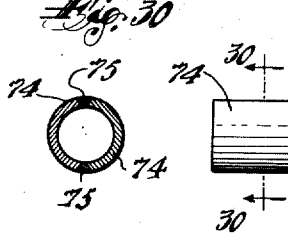
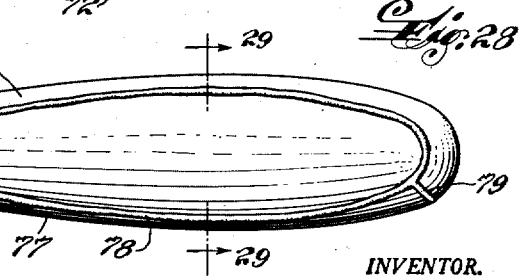
INVENTOR.
Ralph B. Burton
BY
Harry B. Cook
ATTORNEY Patented Feb. 6, 1951

2,540,709

UNITED STATES PATENT OFFICE 2,540,709

METHOD OF MAKING PROPELLER BLADES FOR AIRPLANES

Ralph B. Burton, Paterson, N. J.

Application June 12, 1945, Serial No. 598,939

1 Claim. (Cl. 29—156.8)

This invention relates to the manufacture of propellers for airplanes, particularly propellers suitable for use on modern large airplanes for commercial and war purposes. Airplanes of this particular type and especially such machines designed for flight at high altitude require propellers made of steel, and while several methods of making such propellers have been and are in use, they leave much to be desired in rate of production, avoidance of waste of material and labor and quality of the propellers.

One of such methods consists in the welding together of two pieces of alloy steel of different thicknesses, widths and lengths, which are so thin in the raw stock condition that projections on the finished blade such as the flange and the cuff ring on the shank of the blade must be welded in place or rings of other pieces of the same material must be brazed on the shank. In one welding method, the material from which the cuff ring is made is deposited in layers on the shank until a sufficient height or thickness of such material is attained to permit not only the upsetting of the flange at the end of the shank, using the welded material as a shoulder upon which the force of upsetting is imposed, but also to allow the machining of the cuff ring to its proper dimensions.

While welding per se is a successful commercial art, nevertheless as it is practiced by more or less unskilled workmen in the average production plant, tremendous loss of material and labor is suffered, and in view of the possible faults incidental to lack of skill in the welding operation or the selecting of the welding rods, with consequent lack of strength in the finished blade, it has been customary to use somewhat heavier raw stock than otherwise could be used. Furthermore, in the production of steel blades according to some known methods, the welding of the cuff ring, for example, occurs so late in the series of operations that the loss of any blade due to faulty workmanship or material, is tremendous in the aggregate.

Therefore, one important object of my invention is to provide a novel and improved method of making steel propeller blades wherein the amount of welding required shall be reduced to a minimum, particularly at points of high stress in the blade, such as the zone in which the cuff ring is located.

Another object is to provide a novel and improved method of forming an external ring such as a cuff ring on the shank of a propeller blade from virgin metal, i. e. the metal of which the blade shank itself is formed, whereby the rate of production of propeller blades may be increased and the shank shall be strong and devoid of objectionable folds or other faults in the grain structure of the metal.

A further object is to provide such a method of forming a ring in either a one-piece shank or a shank composed of a plurality of pieces, by upsetting the metal in the shank from the inside to the outside.

Other objects of the invention are to provide a steel propeller blade which shall embody novel and improved features of construction such that the blade can be economically produced from a standpoint of both labor and materials, shall include a minimum of welding and shall be strong and durable; and to obtain other advantages and results that will be brought out by the following description in conjunction with the accompanying drawings in which Figure 1 is a view partially in vertical section and partially in elevation, showing one step in a method of forming a propeller blade from one piece of material.

Figure 2 is a side elevational view illustrating the condition of the material at the end of a succeeding step in the method.

Figure 3 is a similar view illustrating the result of a subsequent step in the method.

Figure 4 is a vertical longitudinal sectional view through a die showing the method of imparting the final shape to the blade by hydraulic pressure.

Figure 5 is a transverse vertical sectional view on the line 5—5 of Figure 4.

Figure 6 is an end elevational view of the finished blade from the end of the shank thereof.

Figure 7 is an enlarged transverse vertical sectional view through a portion of the propeller blade after the forming operation illustrated in Figure 4.

Figure 8 is a similar view showing the blade after a portion of the metal has been ground away at the trail edge of the blade.

Figure 9 is a top plan view of a partially completed propeller blade made according to another form of my invention.

Figure 10 is an enlarged transverse vertical sectional view on the line 10—10 of Figure 9.

Figure 11 is a similar view on the line 11—11 of Figure 10.

Figure 12 is a top plan view of a sheet blank used in the manufacture of a propeller blade according to another modification of my invention.

Figure 13 is a top plan view of said blank illustrating it at the end of a succeeding operation.

Figure 14 is an end elevational view of the plate shown in Figure 13.

Figure 15 is a side elevational view thereof.

Figure 16 is a schematic side elevational view of apparatus for forming the plate as it is illustrated in Figures 13 to 15 inclusive.

Figure 17 is a transverse vertical sectional view on the line 17—17 of Figure 16.

Figure 18 is a view similar to Figure 13 showings the manner of trimming the plates prior to forming thereof and assembly into a propeller blade.

Figure 19 is a schematic vertical longitudinal sectional view through a die and plunger and showing the manner of forming the plates prior to their assembly.

Figure 20 is a transverse vertical sectional view on the line 20—20 of Figure 19.

Figure 21 is a top plan view of a propeller blade formed of two plates like that illustrated in Figures 19 and 20.

Figure 22 is an enlarged transverse vertical sectional view on the line 22—22 of Figure 21.

Figure 23 is a similar view through the shank portion of the propeller on the line 23—23 of Figure 21.

Figure 24 is a fragmentary vertical longitudinal sectional view through the tip end of the propeller blade on the line 24—24 of Figure 21.

Figure 25 is a vertical longitudinal sectional view through a two-part die and the shank portion of a propeller blade therein showing the first step in the formation of an external ring such as a cuff ring on the shank.

Figure 26 is a similar view showing the shank of the propeller blade in another die cavity and illustrating a subsequent step in the method consisting of ironing outwardly the metal upset on the inside of the shank by the step of the method illustrated in Figure 25.

Figure 27 is a view similar to Figure 26 showing the next step in the method which comprises the upsetting of the shank to provide sufficient stock in the shank end for the subsequent formation of a flange on the shank.

Figure 28 is a plan view of a partially completed propeller blade made according to another form of my invention.

Figure 29 is an enlarged transverse vertical sectional view on the line 29—29 of Figure 28, and Figure 30 is a transverse vertical sectional view on the line 30—30 of Figure 28.

Specifically describing the embodiment of the invention illustrated in Figures 1 to 8 inclusive, in this form of the invention, the propeller blade is made of a block 1 of steel or other suitable metal or alloy which initially has a hole 2 formed in one end thereof either by machining or by swaging operations one of which is illustrated in Figure 1 where the reference characters 3 and 4 designate complemental parts of a die with which cooperates a plunger 5 for swaging the block between them.

The piece 1 in the shape illustrated in Figure 1 is then shaped in any suitable manner as by rolling or spinning operations, into a long round cylinder 6 open at one end and having thin walls and a shape approximately correspoding to the inside measurements of the blade to be formed from its largest cross-sectional dimensions outwardly to its tip as shown in Figure 2. Shaping of the piece is continued by rolling, spinning, swaging or other suitable operations until it is formed into the shape illustrated in Figure 3 wherein the thickness of the walls increases toward the open or shank end as indicated at 7. The partially completed blade as illustrated in Figure 3 is then subjected to suitable operations for forming its cuff ring and for upsetting its shank end if a flange is to be formed on the shank, and finally converted from the cylindrical shape into the usual more or less oval cross section.

One manner of performing these operations is illustrated in Figures 4 and 5 as comprising a two-part die which includes sections 8 and 9 that have complemental recesses 10 which between them provide a die cavity corresponding to the desired cross sectional shape of the propeller blade to be formed.

The die sections also have complemental grooves 11 which produce die cavity for clearing a flange or a cuff ring. The partially finished propeller blade as illustrated in Figure 3 is enclosed between the die sections 8 and 9, after which hydraulic pressure is injected into the blade in any suitable manner, for example, as illustrated in Figure 4 where one of the die sections has a cover plate 12 hingedly connected thereto at 13 to abut the edge of the open end of the shank portion 7 of the blade, said cover being tightly held in this abutting relation to the blade shank by a clamping screw 14 which is carried by an arm 15 that is removably attached to a bracket 16 on the die section by a removable pin 17. The cover has connected thereto a tube or pipe 18 leading from a source of hydraulic pressure, and it will be observed that upon the application of sufficient pressure to the interior of the propeller blade, the walls thereof will be forced outwardly into snug contact with the walls of the die cavities so that the blade portion of the propeller will be properly shaped as shown in Figures 5 and 6.

It will be understood by those skilled in the art that the portion of the blade and the die where substantial flow of metal is required to produce the proper shape, will be heated to facilitate the shaping of the metal.

Figure 7 illustrates the approximate cross-sectional shape of the blade at one portion of its length when it is removed from the die 8, 9, and generally there is an excess of metal at the trail edge of blade as indicated at 19. Preferably this excess of metal is removed as by a grinding or milling operation or by a combination of both to provide the desired streamlined shape on the blade as indicated at 20 in Figure 8.

Another form of my method is illustrated in Figures 9 to 11 inclusive where the propeller blade is formed of two pieces 21 and 22 of steel, the first of which is shaped up in any suitable manner to the general configuration illustrated in Figures 9 and 10 and including a portion which forms the camber side 23 and the shank 24 of the blade. The other piece 22 is shaped to form the thrust side of the blade. The edges of the two sections 21 and 22 are milled at 25 and 26 respectively to form a groove between them in which welding metal 27 is flowed to weld the two sections together. The edges of the section 21 extend longitudinally of the shank portion 24 and also are milled at 28 to form a groove in which welding metal 29 is flowed to weld said edges together.

By properly designing the thrust and camber plates, the weld may be reduced to a minimum, and one or more reenforcing ribs 30 may be provided so as to blend into the thinner plate sections, whereby to reduce the weight of the blade which in turn will reduce the stress caused by the combined thrust and centrifugal forces. Thus the blade may be of minimum weight consistent with the resistance to the stresses that must be encountered during operation of the blade. The blade as shown in Figure 9 may have the cuff ring and shank end formed in any suitable manner to complete the blade.

In order to obtain a blade having the smallest possible weight consistent with safe stress and reasonable cost, a modification of my method may be employed by which the propeller blade is formed of two similar plates, as illustrated in Figures 12 to 24 inclusive. According to this method, a plate 31 of suitable length and thickness is blanked into a shape like that illustrated in Figure 12 and then rolled into a shape approximating that illustrated in Figure 13. During this operation, one or more reenforcing ribs 32 may be rolled of the proper height and width and blended into the thinner portions of the plate. Any desired method and apparatus may be utilized for this purpose, but in Figures 16 and 17 I have shown a table 33 over which the plate 31 is moved longitudinally between two rollers 34 and 35 at least one of which, for example the roller 34, is driven in the direction of the arrow by any suitable means. The roller 35 is formed with one or more grooves 36 to produce one or more ribs 32 and is mounted on one end of a lever 37 which is pivotally mounted intermediate its ends at 38 on a suitable fixed support and has a roller 39 at its other end which follows a cam 40 that is of the proper contour and is driven by any suitable source of power.

In operation, the end of the plate which is to correspond to the shank of the completed propeller blade is inserted between the rollers 34 and 35 while the latter are spaced apart a distance equal to the thickness of the plate. The plate then is moved by the rollers 34 and 35 in the direction of the arrow in Figure 16 and simultaneously the roller 35 is pressed toward the roller 34 by the cam 40 so as to gradually thin the plate as indicated at 41 at opposite sides of the groove 36 and thence form the rib 32. Sometime later the end portion of the rib is cut away as indicated by dot and dash lines in Figure 15 to clear the rib on another plate when the two plates are joined together.

At the end of this operation the plates have approximately the shape illustrated in Figures 13, 14 and 15, and one plate is then blanked or sawed into the shape illustrated by solid lines in Figure 18 to serve as the camber plate while another plate is similarly treated to produce a shape approximating that illustrated by dot and dash lines in Figure 18, to serve as the thrust plate. The two plates then are formed into their approximate faired shape by an suitable means such as a die 42 and a complemental plunger 43 whose juxtaposed surfaces are complementally shaped to press the propeller plates into the desired shape including a shank portion 45.

The plates after they have been formed by the die and plunger have the shapes approximating those shown in Figures 21 to 24 inclusive where the camber plate is designated 46 and the thrust plate is designated 47. The perimetral edges of the plates are cut away in any suitable manner as by milling as indicated at 48 to form grooves between them whose walls are disposed at angles from 35° to 90° to receive welding metal 49 for welding the plates together. The strengthening ribs 32 should be so located by either the rolling or the blanking operations that they will be clear of each other in the finished blade in case the blade "breathes" while the plane is flying high in the stratosphere.

With this construction, it will be noted that there is a minimum of welding in the blade, especially as compared with the blades formed according to heretofore known methods wherein large quantities of welding metal are applied to the trail and lead edges of the blade at the juncture of the thrust and camber plates.

After the plates have been welded together as above described, the blade may be hydraulically shaped and faired, and before forming of the cuff ring and the upsetting of the shank, if desired.

Another manner of forming a propeller blade is shown in Figures 28 to 30 where the thrust plate 72 and the camber plate 73 are each shaped in any desired manner and have formed integrally thereon one-half 74 of the shank portion of the blade. The shank portions 74 are welded together as indicated at 75 while the other edge portions of the camber and thrust plates are connected together by edge sections 76 and 77 whose edges are welded to the edges of the thrust and camber plates as indicated at 78. The ends of the edge sections are welded to each other as indicated at 79 although it will be understood that if desired the two edge sections might be formed integrally with each other.

With this and the other welded constructions it will be observed that the distortion and internal stress caused by the unequal welded zones in propeller blades made according to heretofore known methods, are eliminated.

As hereinbefore indicated, an important feature of my invention is a novel and improved manner of producing the cuff ring on the shank of the blade from virgin metal, except for the small weld spots that occur as the result of the welding of the two plates together. This method is schematically illustrated in Figures 25 to 27 inclusive. In forming the cuff ring a circumferential shoulder 50 is formed on the exterior of the shank portion of the blade at approximately the zone where the cuff ring is to be located to take the thrust incident to the upsetting operation. This shoulder may be formed in any suitable manner and at any suitable time but conveniently may be formed in the same die and in the same operation with the upsetting incident to the formation of the cuff ring.

In Figure 25 the shank 51 of the blade is shown as clamped between the two sections 52 and 53 of a two-part die, and said die sections have an opening or die cavity extending therethrough, the radius of one end 54 of which is less than the radius of the main portion of the opening an amount equal to the height of the desired shoulder 50; and the die sections have grooves 55 which complement each other to form a complete circumferential groove in the walls of the die cavity. One wall of each groove intersects the walls of the reduced end 54 of the cavity so as to form a shoulder to take the thrust imposed on the shank 51 by a plunger 56 which has a reduced portion 57 to nicely fit the interior diameter of the shank and forming a shoulder 58 to abut the outer end of the shank, said reduced portion being slightly tapered to facilitate withdrawal thereof.

In operation, the portion of the shank on which the shoulder 50 is to be formed is heated by any suitable means such as induction heating or by acetylene heating ring methods and after heating is inserted in the die. As the die sections are closed about it the shoulder 50 is formed. Then the plunger 56 is forced inwardly of the die with its shoulder 58 abutting the end of the shank, whereby a portion of the shank is upset inwardly as indicated at 59 and a small portion of the metal of the shank may be forced outwardly into the groove 58, as indicated at 60. Preferably the free end of the plunger 56 has a second reduced portion 61 of such diameter as to limit the extension of the upset portion 59 inwardly of the shank. It should be understood that it is not necessary to provide groove 55 nor that the shank be permitted to be outwardly upset as indicated at 60, as will subsequently appear.

Thereafter the shank is inserted into another die cavity 62 which has a circumferential groove 63 in its walls deeper than the groove 55, one wall of which abuts the shoulder 50. Preferably the die cavity also has an interior circumferential rib 64 at the side of and between the shoulder 50 and the free end of the shank. The shank is heated as heretofore before it is placed in the die and as the die sections close, the rib 64 forms a groove 65 in the exterior and forces a small additional amount of metal to the interior of the shank. The inwardly upset portions of the shank are then ironed outwardly into the groove 63 in the dies to form the cuff ring. This may be accomplished by forcing an ironing plunger 66 into the shank, said plunger having a tapered head 67 increasing in diameter inwardly from the end thereof and the greatest diameter of which is such that as the plunger is forced through the shank, the metal pressed inwardly by the rib 64 in the die cavity and the metal in the upset portion 59 will be ironed or pressed or squeezed outwardly into the groove 63 so as to form a cuff ring 68 on the exterior of the shank. It will thus be seen that the cuff ring is formed of virgin metal, that is, the metal in the shank, except for the small spots of welding metal that are incident to the welding of the thrust and camber plates together.

The blade may then be subjected to any further operations that are usual or desirable in the manufacture of propeller blades; for example, if the blade is to have a flanged shank, the shank portion may be further upset as indicated in Figure 27 so as to provide adequate metal to form the flange. The shank may be heated and replaced in the same die cavity 62 and then subjected to the action of a ram 69 which has a shoulder 70 to abut the end of the shank and the thrust from which is taken up by the cuff ring in the groove 63 and by the rib 64 on the die cavity which is seated in the groove 65 in the shank. As the result of this operation, the metal of the shank is upset and pushed inwardly as indicated at 71 and thereafter may be formed into a flange in the usual way or machined in any suitable manner and for any desired purpose.

The welds and welding operations herein referred to may be performed according to various methods of joining pieces of metal together requiring heat, with or without the addition of other material of like or unlike nature and with or without a fluxing agent, including hydrogen brazing; and to avoid circumlocution in the appended claims, the terms "weld," "welded" or "welding" are intended to be so construed.

While I have shown my invention as embodied in certain details of construction and method steps, it will be understood that many modifications and changes may be made in the construction of the blade and in the steps of the method within the spirit and scope of the invention.

I claim:

The method of forming an external annular flange on the tubular shank of an airplane propeller blade, which comprises forming a circumferential shoulder on the exterior of said shank, holding said shank at said shoulder against longitudinal movement, applying pressure upon the end of said shank longitudinally in opposition to said point of holding and thereby upsetting the walls of said shank inwardly to form a bulge on the inner surface of the shank at the zone in which the rib is to be formed, squeezing said shank annularly inwardly in closely spaced relation to said shoulder between said shoulder and said end of the shank to force material of the shank inwardly and form an annular groove on the exterior of said tubular shank and an annular rib on the inner surface of the shank adjacent said bulge, holding the shank at said shoulder and said groove against longitudinal movement and thereafter ironing or displacing the material from said bulge and said rib toward the exterior of the shank by reciprocating an ironing plunger longitudinally in said tubular shank while the shank is so held, constraining said displaced material to move into a predetermined configuration on the outer surface of the shank to form a flange.

RALPH B. BURTON.

REFERENCES CITED

The following references are of record in the file of this patent:

UNITED STATES PATENTS

| Number | Name | Date |
|---|---|---|
| 1,854,550 | Jamison | Apr. 19, 1932 |
| 1,869,478 | Heath | Aug. 2, 1932 |
| 1,945,092 | Storer | Jan. 30, 1934 |
| 2,089,784 | Cornell | Aug. 10, 1937 |
| 2,094,076 | Martin | Sept. 28, 1937 |
| 2,138,370 | Caldwell | Nov. 29, 1938 |
| 2,306,177 | Mattson | Dec. 22, 1942 |
| 2,319,546 | Insley et al. | May 18, 1943 |
| 2,340,784 | Westin et al. | Feb. 1, 1944 |
| 2,362,745 | Davidson | Nov. 14, 1944 |

OTHER REFERENCES

Ser. No. 314,024, Zellbeck (A. P. C.), pub. Apr. 27, 1943 (now allowed).